(12) United States Patent
Cotanis

(10) Patent No.: US 10,278,081 B2
(45) Date of Patent: Apr. 30, 2019

(54) METHODS AND APPARATUS FOR SELF OPTIMIZATION AND/OR IMPROVEMENT OF A CLOUD-BASED WIRELESS NETWORK

(71) Applicant: Viavi Solutions Inc., Milpitas, CA (US)

(72) Inventor: Nicolae G. Cotanis, Warrenton, VA (US)

(73) Assignee: VIAVI Solutions Inc., San Jose, CA (US)

(*) Notice: Subject to any disclaimer, the term of this patent is extended or adjusted under 35 U.S.C. 154(b) by 2 days.

(21) Appl. No.: 15/515,577

(22) PCT Filed: Sep. 30, 2015

(86) PCT No.: PCT/US2015/053183
§ 371 (c)(1),
(2) Date: Mar. 29, 2017

(87) PCT Pub. No.: WO2016/054183
PCT Pub. Date: Apr. 7, 2016

(65) Prior Publication Data
US 2017/0311183 A1 Oct. 26, 2017

Related U.S. Application Data

(60) Provisional application No. 62/057,814, filed on Sep. 30, 2014.

(51) Int. Cl.
H04L 1/00 (2006.01)
H04W 24/02 (2009.01)
(Continued)

(52) U.S. Cl.
CPC ............ H04W 24/02 (2013.01); H04L 41/12 (2013.01); H04L 47/11 (2013.01); H04W 24/10 (2013.01);
(Continued)

(58) Field of Classification Search
CPC ....... H04W 4/26; H04W 24/08; H04W 24/02; H04W 24/10; H04W 28/16;
(Continued)

(56) References Cited

U.S. PATENT DOCUMENTS 9,917,669 B2* 3/2018 Wu ..................... H04W 52/346
2010/0017247 A1 1/2010 Liu et al.
(Continued)

FOREIGN PATENT DOCUMENTS

WO 2013/072108 5/2013

OTHER PUBLICATIONS

International Search Report and Written Opinion corresponding to PCT/US2015/053183, dated Feb. 2, 2016, 7 pages.
(Continued)

Primary Examiner — Faisal Choudhury
(74) Attorney, Agent, or Firm — Harrity & Harrity, LLP

(57) ABSTRACT

In some embodiments, an apparatus includes a monitor module configured to monitor a set of performance indicators associated with a first network topology of a wireless network provider system. In the first network topology, a set of virtual baseband units services a set of remote radio heads. The apparatus includes a detector module configured to detect an operational condition of the wireless network provider system based on at least one value associated with the set of performance indicators at a first time. The apparatus further includes an optimization module configured to define, based on the operational condition, a second network topology for the set of virtual baseband units. The optimization module is further configured to send a signal to a virtual baseband unit pool manager to configure the wireless network provider system in the second network topology at a second time after the first time.

21 Claims, 6 Drawing Sheets

(51) Int. Cl.
    *H04W 28/16*     (2009.01)
    *H04W 88/08*     (2009.01)
    *H04L 12/24*     (2006.01)
    *H04L 12/801*     (2013.01)
    *H04W 24/10*     (2009.01)
    *H04W 28/02*     (2009.01)

(52) U.S. Cl.
    CPC ....... *H04W 28/0289* (2013.01); *H04W 28/16* (2013.01); *H04W 88/085* (2013.01)

(58) Field of Classification Search
    CPC ............ H04W 28/0289; H04W 88/085; H04L 41/12; H04L 47/11
    USPC .......................................................... 370/252
    See application file for complete search history.

(56) References Cited

U.S. PATENT DOCUMENTS

| | | |
|---|---|---|
| 2013/0114464 A1 | 5/2013 | Tarraf et al. |
| 2013/0242720 A1 | 9/2013 | Chou |
| 2013/0272170 A1* | 10/2013 | Chatterjee ............. H04W 28/02 370/280 |
| 2013/0281049 A1* | 10/2013 | Lee ........................ H04W 24/00 455/405 |
| 2014/0031049 A1 | 1/2014 | Sundaresan et al. |
| 2014/0073303 A1 | 3/2014 | Henderson et al. |
| 2014/0073322 A1 | 3/2014 | Hendersen et al. |
| 2014/0204794 A1 | 7/2014 | Ei-Najjar et al. |
| 2016/0029205 A1* | 1/2016 | Sirotkin ................ H04W 24/02 455/418 |
| 2016/0073278 A1* | 3/2016 | Roessler ................ H04L 49/70 370/252 |

OTHER PUBLICATIONS

European Search Report for European Application No. 15846317.4; dated Apr. 20, 2018, 11 pages.

\* cited by examiner

METHODS AND APPARATUS FOR SELF OPTIMIZATION AND/OR IMPROVEMENT OF A CLOUD-BASED WIRELESS NETWORK

CROSS REFERENCE TO RELATED APPLICATIONS

This application claims priority to PCT Application No. PCT/US2015/053183, filed Sep. 30, 2015, which claims priority to U.S. Provisional Patent Application No. 62/057,814 filed on Sep. 30, 2014, the contents of which are incorporated herein by reference.

BACKGROUND

Some embodiments described herein relate generally to system optimization mechanisms for wireless networks, and, in particular, to methods and apparatus for dynamic virtualization and optimization in a cloud-based wireless network.

With the number of mobile users rapidly rising, a growing demand exists for mobile broadband while reducing operational expenses for operators of wireless networks. Some known wireless networks implement a network optimization process to find improved configurations and improve the performance for the wireless networks. Such known wireless networks typically rely on a static relationship between remote radio heads ("RRHs") and baseband units ("BBUs"). Such static optimization processes typically fail to use and position system resources most efficiently and intelligently to obtain optimal coverage and capacity without quality degradation.

Accordingly, a need exists for methods and apparatus for implementing a cloud-based system that can dynamically change the configuration and topology to improve the wireless network through control of the BBUs.

SUMMARY

In some embodiments, an apparatus includes a monitor module implemented in at least one of a memory or a processing device of a wireless network provider system. The monitor module is configured to monitor a set of performance indicators associated with a first network topology. In the first network topology, a set of virtual baseband units services a set of remote radio heads of the wireless network provider system. The apparatus includes a detector module operatively coupled to the monitor module. The detector module is configured to detect an operational condition of the wireless network provider system based on at least one value associated with the set of performance indicators at a first time. The apparatus further includes an optimization module operatively coupled to the detector module. The optimization module is configured to define, based on the operational condition, a second network topology for the set of virtual baseband units. The optimization module is further configured to send a signal to a virtual baseband unit pool manager to configure the wireless network provider system in the second network topology at a second time after the first time.

DETAILED DESCRIPTION

Figure 1A:
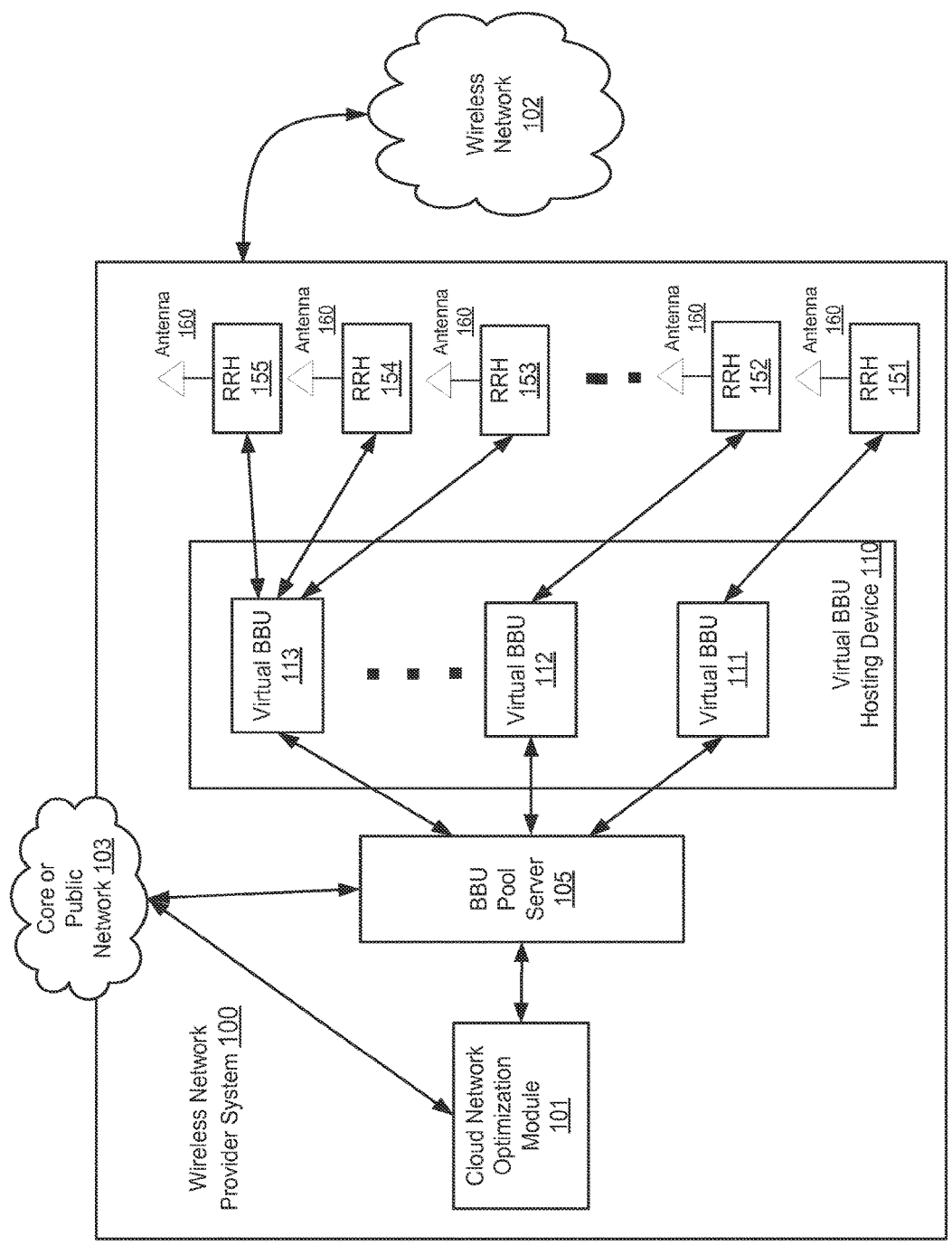
FIGS. 1A-1B are schematic diagrams that illustrate a wireless network provider system configured to improve or maximize the overall network performance for a wireless network, according to an embodiment.

In some embodiments, an apparatus includes a monitor module implemented in at least one of a memory or a processing device of a wireless network provider system. The monitor module is configured to monitor a set of performance indicators associated with a first network topology. In the first network topology, a set of virtual baseband units services a set of remote radio heads of the wireless network provider system. The apparatus includes a detector module operatively coupled to the monitor module. The detector module is configured to detect an operational condition of the wireless network provider system based on at least one value associated with the set of performance indicators at a first time. The apparatus further includes an optimization module operatively coupled to the detector module. The optimization module is configured to define, based on the operational condition, a second network topology for the set of virtual baseband units. The optimization module is further configured to send a signal to a virtual baseband unit pool manager to configure the wireless network provider system in the second network topology at a second time after the first time.

In some embodiments, an apparatus includes a memory and a hardware processor operatively coupled to the memory and configured to implement a monitor module, a detector module and an optimization module. The monitor module is configured to monitor a set of performance indicators associated with a wireless network provider system. The wireless network provider system includes a first set of virtual baseband units servicing at a first time a set of remote radio heads to define a first network topology. The detector module is configured to define an operation condition of the wireless network provider system, at the first time, when at least one value associated with the set of performance indicators fails to meet a performance criterion. The optimization module is configured to send a signal to a virtual baseband unit pool manager, at a second time after the first time, such that the virtual baseband unit pool manager causes a second set of virtual baseband units to service the set of remote radio heads after the second time to define a second network topology different from the first network topology.

In some embodiments, a method includes monitoring a set of performance indicators associated with a first network topology and/or configuration of a wireless network provider system. The first network topology and/or configuration includes a first set of virtual baseband units servicing a first set of remote radio heads of the wireless network provider system. The method further includes defining, at a first time and based on at least one value associated with the set of performance indicators, a second network topology and/or configuration of the wireless network provider system. The second network topology and/or configuration includes a second set of virtual baseband units servicing a second set of remote radio heads of the wireless network provider system. The method further includes sending a signal to a virtual baseband unit pool manager to transition the wireless network provider system from the first network topology and/or configuration to the second network topology and/or configuration at a second time after the first time.

As used herein, a module can be, for example, any assembly and/or set of operatively-coupled electrical components, and can include, for example, a memory, a processor, electrical traces, optical connectors, software (executing in hardware) and/or the like.

As used herein, the singular forms "a," "an" and "the" include plural referents unless the context clearly dictates otherwise. Thus, for example, the term "a cloud network optimization module" is intended to mean a single physical device or a combination of physical devices.

Figure 1B:
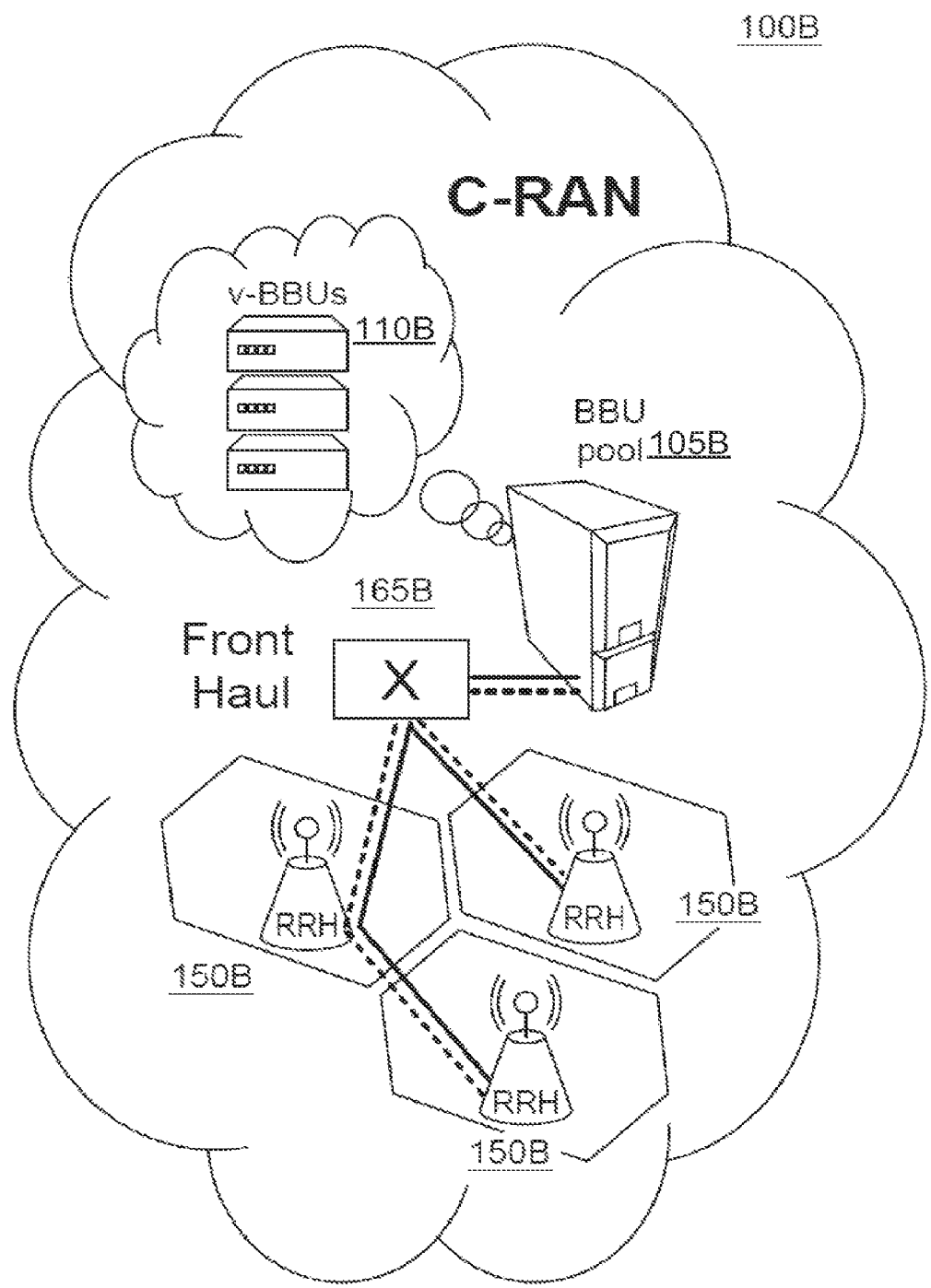

FIGS. 1A-1B are schematic diagrams that illustrate a wireless network provider system 100 configured to improve or maximize the overall network performance of a wireless network 102, according to an embodiment. The wireless network 102 can be any network that enables wireless communication devices (e.g., cellular phones, Wi-Fi enabled laptops, Bluetooth devices, mobile devices) to communicate with each other. In some embodiments, the wireless network 102 can be implemented and administered using a wireless transmission system such as radio frequency (RF) waves. For example, the wireless network 102 can be a cellular network that enables cellular phones to communicate with each other. For another example, the wireless network 102 can be a Wi-Fi network that enables Wi-Fi enabled laptops to be operatively connected. In some embodiments, the wireless network 102 can be at least a portion of, for example, a wireless local area network (WLAN), a wireless mesh network, a wireless metropolitan area network (MAN), a wireless wide area network (WAN), a mobile device network (e.g., a global system for mobile communications (GSM) network, a personal communications service (PCS) network), a radio access network (RAN), a long term evolution (LTE) network, a Universal Mobile Telecommunications System (UMTS) network and/or the like. In some embodiments, the wireless network 102 can include the connections between multiple base stations (i.e., the backhaul).

As shown in FIG. 1A, the wireless network provider system 100 includes a cloud network optimization module 101, a baseband unit ("BBU") pool server 105, a set of virtual BBUs (e.g., virtual BBUs 111, 112, and 113) situated within a virtual BBU hosting device 110, and a set of remote radio heads ("RRHs") (e.g., RRHs 151, 152, 153, 154, and 155) connected to an array of antennas 160 to transmit and receive signals with the wireless network 102. Similarly stated, the antennas 160 can provide the signals and/or connectivity to define at least a portion of the wireless network 102. As discussed in detail herein, the topology and/or the configuration of the wireless network provider system 100 can be changed and/or reconfigured to optimize and/or improve the performance of the wireless network 102 based on performance indicators associated with the wireless network provider system 100 and/or the wireless network 102. The various components within the wireless network provider system 100 can be connected with each other via a wired connection (e.g., fiber optic, Ethernet, etc.) and/or a wireless connection. The cloud network optimization module 101 and/or the BBU pool server 105 can be connected, wired or wirelessly, to a core or public network 103 (e.g., a local area network (LAN)).

The RRHs (e.g., RRHs 151, 152, 153, 154, and 155) include digital-analog converters and can process signals as specified by, for example, open base station architecture initiative ("OBSAI"), Common Protocol Radio Interface ("CPRI"), or other propriety digital interfaces. The RRHs can convert the signals to be transmitted by the set of antennas 160 from one range of frequencies to another range of frequencies (e.g., from baseband to radio frequency). For the signals to be received from the set of antennas 160 at the RRHs, the RRHs are also configured to convert the signals from one range of frequencies to another range of frequencies (e.g., from radio frequency to baseband). In some instances, the RRHs are configured to place and/or modulate signals to be sent by the antennas 160 onto a carrier frequency. Similarly, in some instances, the RRHs are configured to remove and/or demodulate signals received from the antennas 160 at the RRHs from a carrier frequency.

The virtual BBUs (e.g., 111, 112, and 113) can be virtual machines configured to implement base station functionalities. In some embodiments, the virtual BBUs are executed and/or instantiated by a processor situated in the BBU pool server 105. In some embodiments, the virtual BBUs are instantiated by a processor situated in a virtual BBU hosting device 110 separate from the BBU pool server 105. Each virtual BBU can be configured to send control signals (or instructions) to one or many RRHs, and process data received from one or many RRHs. In some embodiments, the virtual BBUs can be instantiated and/or executed by a single processor at a central location. In other embodiments, the BBUs can be distributed across multiple processors and/or locations. In some embodiments, for example, the virtual BBUs 111-113 can be instantiated and/or executed across multiple servers within a data center. This allows physical servers to be turned off (thus reducing power) when the additional processing power is not being used by the demands of the wireless network 102.

The BBU pool server 105 is a compute device that can instantiate, terminate and/or reconfigure or reassign the virtual BBUs (e.g., 111, 112, and 113). For example, the BBU pool server 105 can have a memory (not shown) and a processor (not shown) configured to execute code stored in the memory to instantiate, terminate and/or reconfigure or reassign the virtual BBUs. The BBU pool server 105 can execute instructions received from the cloud network optimization module 101 to instantiate and terminate the virtual BBUs. Moreover, the BBU pool server 105 can execute instructions received from the cloud network optimization module 101 to reconfigure, reassign, and/or rebalance the relationships between the virtual BBUs 111, 112, 113 and the RRHs 151-155, as described in further detail herein. Accordingly, based on instructions received from the cloud network optimization module 101, the BBU pool server 105 can modify a network topology of the virtual BBUs. The BBU pool server 105 is also referred to herein as a virtual baseband unit pool manager.

The cloud network optimization module 101 can be any compute device or software module configured to optimize or improve the performance of the wireless network 102 by instantiating new virtual BBUs, terminating existing virtual BBUs, establishing and/or adjusting the mapping of the virtual BBUs and the RRHs between one-to-one (e.g., one RRH is assigned to one virtual BBU) and/or one-to-many (e.g., more than one RRHs are assigned to one virtual BBU). In some embodiments, the cloud network optimization module 101 can be, for example, a computer device, a server device, an application server, a mobile device, a workstation, and/or the like. The cloud network optimization module 101 can be, for example, hardware and/or software executing in hardware. For example, the cloud network optimization module 101 can be software executing on the BBU pool server 105. The cloud network optimization module 101 can be operatively coupled (e.g., directly or indirectly) to the devices within the wireless network 102. The cloud network optimization module 101 can be, for example, operatively coupled to the BBU Pool Server 105 via one or multiple intermediate modules and/or devices such as, for example, a controller device, a network, and/or the like (not shown in FIG. 1A). The cloud network optimization module 101 can be, for example, coupled to devices of the wireless network provider system 100 via any suitable connecting mechanism such as, for example, optical connections (e.g., optical cables and optical connectors), electrical connections (e.g., electrical cables and electrical connectors), wireless connections (e.g., wireless transceivers and antennas), and/or the like. While shown in FIG. 1A as a single device, in some arrangements the functionality of the cloud network optimization module 101 can be distributed to multiple devices across the wireless network provider system 100.

The cloud network optimization module 101 can be configured to execute a virtualization and optimization processes or methods to reconfigure the topology of the wireless network provider system 100 to optimize or improve the performance of the wireless network 102. Such a virtualization and optimization process or method can be executed to improve the performance of the wireless network 102 from, for example, a suboptimal performance. Additionally, the virtualization and optimization process can be used to ensure that the available processing capabilities of the virtual BBUs 111-113 are being effectively used and not wasted. Specifically, the cloud network optimization module 101 can be configured to monitor the wireless network 102 and collect or receive power indications, link connection information, throughput indication, configuration parameters and/or Key Performance Indicators (KPIs) from the wireless network 102. Based on the collected or received data, the cloud network optimization module 101 can be configured to detect poor network performance in the coverage areas of some RRHs in the wireless network provider system 100. Moreover, the cloud network optimization module 101 can receive indications of a load on and/or a current available processing power at each virtual BBU 111-113. The cloud network optimization module 101 can then be configured to determine how to establish or adjust the mapping of the virtual BBUs and the RRHs. Based on the optimization decisions, the cloud network optimization module 101 can then be configured to send and/or execute instructions to instantiate new virtual BBU, terminate existing virtual BBU, establish and/or adjust the mapping of the virtual BBUs and the RRHs between one-to-one (e.g., one RRH is assigned to one virtual BBU) and/or one-to-many (e.g., more than one RRHs are assigned to one virtual BBU). The configuration modifications can then be applied at the corresponding devices.

The cloud network optimization module 101 can define a static or a dynamic relationship between the virtual BBUs 111-113, and the RRHs 151-155 in substantially real-time. In other instances, virtual BBUs 111-113 can be defined and statically associated with RRHs 151-155. In some instances, as the wireless network traffic load and/or distribution changes, the cloud network optimization module 101 can, dynamically and in real-time in response to the changes of the wireless network traffic load and/or distribution, and reconfigure the topology of the wireless network provider system 100. The cloud network optimization module 101 can, for example, instantiate new virtual BBUs, terminate existing virtual BBUs, establish and/or adjust the mapping of the virtual BBUs and the RRHs between one-to-one (e.g., one RRH is assigned to one virtual BBU) and/or one-to-many (e.g., more than one RRHs are assigned to one virtual BBU). For example, when the network densification is increased due to capacity, one-to-one BBU-RRH associations can be defined and sufficient resources (e.g., BBU processing power and/or capabilities) can be allocated to each virtual BBU. When the wireless network provide system 100 augments the coverage area of the wireless network 102 (e.g., as defined by the RRHs 151-155), and/or when less processing power is needed, one-to-many BBU-RRH associations can be defined so that other RRHs not previously in use can also be associated with a given virtual BBU to obtain a wider coverage. Moreover, if less BBU processing power is being used, hardware (e.g., servers) running virtual BBUs can be shut down or put into a hibernation state to reduce the amount of power used by the BBUs. Similarly stated, operation of the virtual BBUs 111-113 servicing the RRHs 151-155 can be consolidated onto few virtual BBUs 111-113 and/or onto fewer servers executing the virtual BBUs 111-113. Such optimization allows the system to operate more efficiently without wasting resources while ensuring that sufficient resources are provided during peak use.

In some instances, when the cloud network optimization module 101 changes the topology of the wireless network provider system 100 (e.g., the BBU-RRH associations), the parameters and/or configuration (e.g., transmit power, cell identifier, number of licenses, and/or the like) of the BBUs can also be updated. Specifically, for example, when the cloud network optimization module 101 of the wireless network provider system 100 updates the BBU-RRH mappings (e.g., based on increased network densification), parameters and/or a configuration associated with the BBUs and/or RRHs can be identified. For example, the transmit power, the cell identifier, the number of licenses associated with a BBU, and/or other parameters can be updated to optimize and/or improve the network performance for the newly defined topology. Moreover, in some instances, when the cloud network optimization module 101 changes the parameters and/or configuration of the BBUs (e.g., transmit power, cell identifier, number of licenses, and/or the like), the topology of the wireless network provider system 100 can be evaluated and/or changed to provide better performance. Similarly stated, in such instances, the BBU-RRH mappings can be defined based on and/or as a result of other configuration changes to the BBUs.

For a specific example, the wireless network traffic load and distribution can be different on different days for a wireless network near a stadium. On a game day in the stadium, the traffic load increases drastically and it is desired to provide the wireless network with more mobile broadband near the stadium. The wireless network provider system 100 can be configured to define one-to-one BBU-RRH associations and allocate sufficient resources and processing power to each virtual BBU. On a non-game day in the stadium, the wireless network traffic load decreases and less processing power is used to process the wireless network traffic. Additionally, it may be desirable to provide the wireless network with sufficient coverage for the residents in the same area of the stadium. The wireless network provider system 100 can be configured to terminate some virtual BBUs with low processing and define one-to-many BBU-RRH associations. In such an instance, a single virtual BBU can handle and/or process the wireless network traffic associated with multiple RRHs. In some instances, the one-to-many BBU-RRH association can also provide a wider network coverage and/or can use less hardware processing power such that hardware can be shut down or put into a hibernation state. In such an instance, the wireless network provider system 100 can be configured to associate other RRHs not previously in use with the virtual BBU to define one-to-many BBU-RRH associations for the purpose of wider network coverage.

In one instance, the cloud network optimization module 101 can change the Radio Access Technology (RAT) used by the virtual BBUs and therefore change radio signals transmitted or received by RRHs based on network use. For example, the RAT employed by the virtual BBUs supports user devices with third generation (3G) wireless telephone technology in a specific area. If the cloud network optimization module 101 detects that user devices with second generation (2G) wireless telephone technology now have higher penetration in that specific area, the cloud network optimization module 101 can change the RAT used by the virtual BBU to 2G, such that the radio signals transmitted or received by RRHs better support 2G user devices. Similarly stated, based on demand, the RAT used by specific BBUs can be changes and/or updated to better support the current demand. Using a lower generation RAT can increase the number of devices capable accessing the network since higher generation RATs often support lower generation RATs (e.g., 3G devices generally also support 2G).

In one instance, for example, four RRHs can service an area. As long as the total number of subscribers and/or units serviced by the four RRHs is less than a threshold (e.g., less than 50), a single BBU can be used to service all four RRHs. If, however, the cloud network optimization module 101 receives an indication that the total number of subscribers is greater than or equal to 50, additional BBUs can be assigned to the RRHs. For example, if the indication indicates that a first RRH is servicing 40 subscribers, a second RRH is servicing 10 subscribers, a third RRH is servicing 3 subscribers and a fourth RRH is servicing 15 subscribers, the cloud network optimization module 101 can initiate a second BBU to service only the first RRH. In other words, the first RRH is now only serviced by the second BBU. The second RRH, the third RRH and the fourth RRH can continue to be serviced by a single BBU, because the number of subscribers being serviced is not greater than the threshold (i.e., 50). If the traffic being serviced by the first RRH later decreases (e.g., to 10 subscribers), the second BBU can be terminated and the first BBU can service the four RRHs. In other embodiments, any other suitable KPI (e.g., bandwidth) and/or threshold can be used. In still other embodiments, a combination of KPIs and/or thresholds can be used to determine when to rebalance, instantiate and/or terminate BBUs.

In some instances, the physical RRHs 151-155 and the BBU Pool Server 105 are not permanently commissioned for supporting peak wireless network traffic; instead, only a permanent set of cost effective RRHs 151-155 are deployed and connected to virtual base stations by assigning on an on-demand basis virtual BBUs from the BBU Pool Server 105. In some embodiments, the virtual BBUs can be connected to a set of RRHs via a transmission network (e.g., front haul 165 in FIG. 1B).

In some implementations, for example, in an LTE network, the cloud network optimization module 101 can be configured to simplify the implementation of the high-bandwidth low-latency X2 interfaces connecting the geographically distributed virtual eNodeBs. The X2 interfaces can be configured to run within the same computing frame, chassis, rack and/or device that hosts the multiple virtualized BBUs.

In some implementations, the cloud network optimization module 101 can be configured to allow operators to consider a centralized approach within the wireless network 102 to better combine the wireless network traffic load management and the wireless network interference management. The cloud network optimization module 101 can, for example, implement advanced LTE features such as Cooperative Multi-Point (CoMP) and enhanced intercell interference coordination (eICIC) by jointly processing and scheduling signals between virtual BBUs. The cloud network optimization module 101 can be, for example, implemented in heterogeneous networks (HetNets) involving multiple network technologies (UMTS, Wi-Fi, LTE, etc.) and overlapping macro and micro cells that share the same carrier.

As shown in FIG. 1B, the cloud-radio access network ("C-RAN") 100B includes virtual BBUs (v-BBUs) 110B within a BBU pool 105B, and a set of RRHs 150B connected through a front haul 165B. The front haul 165B can be a network, connection and/or set of connections between the v-BBUs 110B and the set of RRHs 150B. The v-BBUs 110B, the BBU pool 105B, and the set of RRHs 150B are structurally and/or functionally similarly to the virtual BBUs (e.g., 111, 112, and 113), the BBU Pool Server 105, and the set of RRHs (e.g., 151-155) shown and described with respect to FIG. 1A, respectively. In some implementations, the virtual BBUs 110B can be connected to a set of RRHs 150B via a transmission network (e.g., front haul 165B in FIG. 1B). The cloud network optimization module 101 (not shown in FIG. 1B), as described in FIG. 1A, can be physically located or operatively deployed within the front haul 165B to perform the virtualization and optimization process. In such an implementation, the cloud network optimization module can also act as a multiplexer and/or switch to ensure that signals received from the RRHs 150B are sent to the appropriate and/or associated v-BBUs 110B. Similarly, the cloud network optimization module can ensure that the signals received from the v-BBUs 110B are sent to the appropriate and/or associated RRHs 150B. In some implementations, the cloud network optimization module 101, as described in FIG. 1A, can be configured to be separate from the front haul to perform the virtualization and optimization process.

Note that the components and/or devices of the wireless network provider system 100 described with respect to FIG. 1A and the C-RAN 100B described with respect to FIG. 1B can be centralized or distributed. For example, the cloud network optimization module 101 of FIG. 1A can be in a location remote from the BBU pool server 105 and/or the virtual BBU housing device 110. In such instances, the cloud network optimization module 101 can be operatively coupled to the BBU pool server 105 and/or the BBU housing device 110 via a network (not shown in FIG. 1A). Similarly, while shown as being within a single virtual BBU housing device 110, the virtual BBUs 111-113 shown in FIG. 1A can be located in different locations and/or instantiated by different devices. For example, a first virtual BBU can be instantiated by a device (e.g., a first server) in a first geographic location and a second virtual BBU can be instantiated by a device (e.g., a second server) in a second geographic location.

Figure 2:
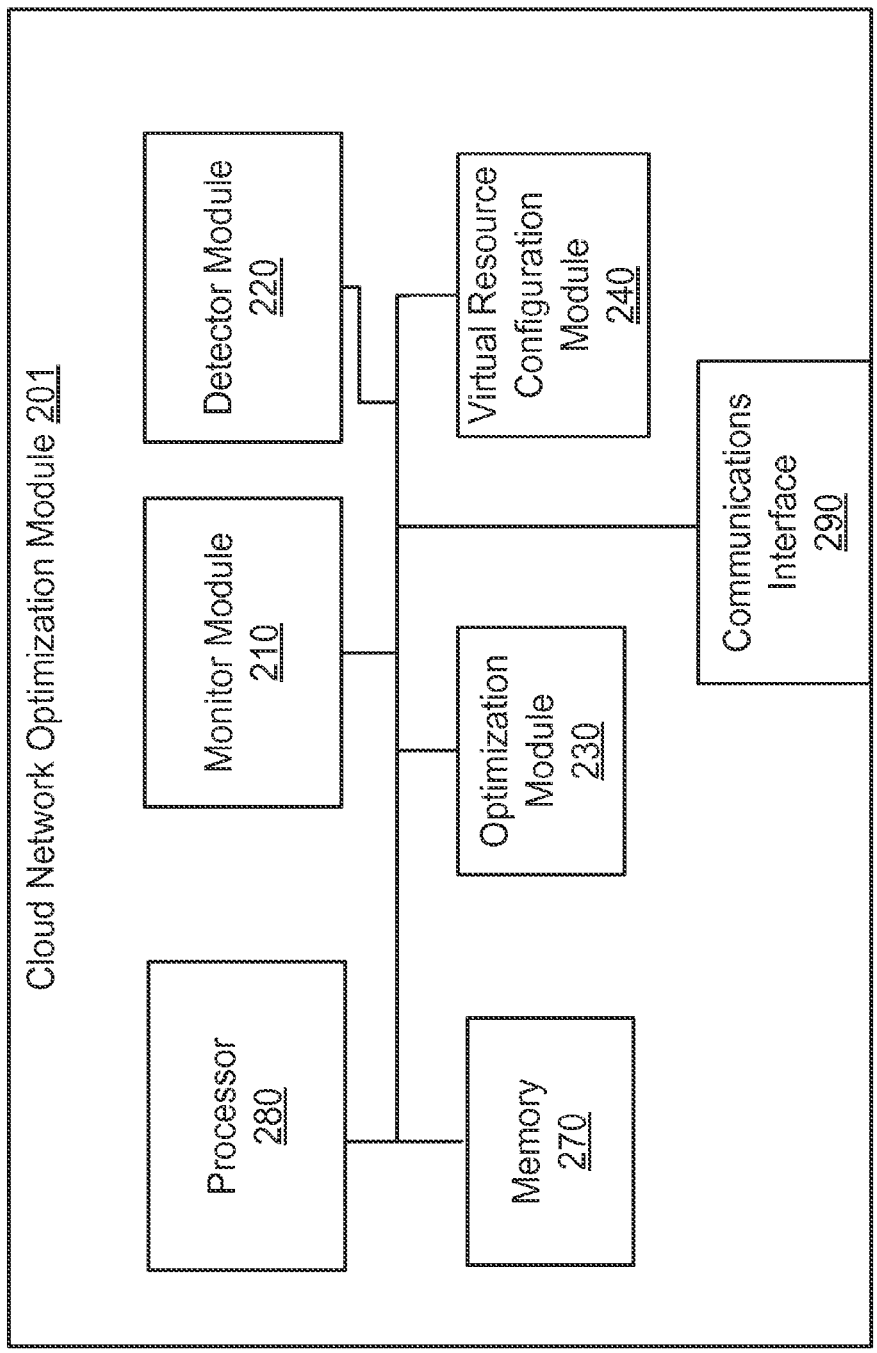
FIG. 2 is a system block diagram of a cloud network optimization module, according to an embodiment.

FIG. 2 is a system block diagram of a cloud network optimization module 201, according to an embodiment. The cloud network optimization module 201 can be structurally and functionally similar to the cloud network optimization module 101 shown and described with respect to FIG. 1. The cloud network optimization module 201 can be coupled to a wireless network (not shown in FIG. 2) that is similar to the wireless network 102 shown and described with respect to FIG. 1. As shown in FIG. 2, the cloud network optimization module 201 can include a processor 280, a memory 270, a monitor module 210, a detector module 220, an optimization module 230, a virtual resource configuration module 240, and a communications interface 290. In some implementations, the cloud network optimization module 201 can be within a single physical device. In some implementations, the cloud network optimization module 101 can be hardware or software executing in hardware. For example, the cloud network optimization module 101 can be software executing on the BBU pool server 105. In some implementations, the cloud network optimization module 201 can be included within multiple physical devices (e.g., operatively coupled by a network), each of which can include one or multiple modules and/or components shown in FIG. 2.

Each module or component in the cloud network optimization module 201 can be operatively coupled to each remaining module or component. Each module or component in the cloud network optimization module 201 can be any combination of hardware and/or software (stored and/or executing in hardware) capable of performing one or more specific functions associated with that module. In some implementations, a module or a component in the cloud network optimization module 201 can include, for example, a field-programmable gate array (FPGA), an application specific integrated circuit (ASIC), a digital signal processor (DSP), and/or the like.

The memory 270 can be, for example, a random-access memory (RAM) (e.g., a dynamic RAM, a static RAM), a flash memory, a removable memory, and/or so forth. In some embodiments, the memory 270 can include, for example, a database, process, application, virtual machine, and/or some other software modules (stored and/or executing in hardware) or hardware modules configured to execute a virtualization and optimization process and/or one or more associated methods for optimizing or improving the performance of the wireless network (e.g., via the communications interface 290). In such implementations, instructions of executing the virtualization and optimization process and/or the associated methods (e.g., such as instructions for the monitor module 210, detector module 220, optimization module 230 and/or the virtual resource configuration module 240) can be stored within the memory 270 and executed at the processor 280.

The communications interface 290 can include and/or be configured to manage one or multiple ports of the cloud network optimization module 201. In some instances, for example, the communications interface 290 can include one or more line cards, each of which can include one or more ports (operatively) coupled to devices (e.g., BBU pool server 105, base stations, etc.) in the wireless network. A port included in the communications interface 290 can be any entity that can actively communicate with a coupled device or over a network. In some embodiments, such a port need not necessarily be a hardware port, but can be a virtual port or a port defined by software. In some embodiments, the connections between the communications interface 290 and the devices in the wireless network provider system can implement a physical layer using, for example, fiber-optic signaling, electrical cables, wireless connections, or other suitable connection means. In some embodiments, the communications interface 290 can be configured to, among other functions, receive data and/or information collected or received from the wireless network provider system, and send configuration modifications, commands, and/or instructions to the devices in the wireless network provider system.

The processor 280 can be configured to control, for example, the operations of the communications interface 290, write data into and read data from the memory 270, and execute the instructions stored within the memory 270. The processor 280 can also be configured to control, for example, the operations of the monitor module 210, the detector module 220, the optimization module 230, and the virtual resource configuration module 240, as described in further detail herein. In some embodiments, the monitor module 210, the detector module 220, the optimization module 230, and the virtual resource configuration module 240 are stored in the memory 270 and executed by the processor 280. In some embodiments, under the control of the processor 280 and based on the methods or processes stored within the memory 270, the monitor module 210, the detector module 220, the optimization module 230, and the virtual resource configuration module 240 can be configured to collectively execute a virtualization and optimization process to optimize or improve the performance of the wireless network, as described in further detail herein.

The monitor module 210 can monitor the performance of the wireless network. Specifically, the monitor module 210 can be configured to collect or receive data and/or information from the RRHs 151-155 of the wireless network provider system 100 and/or from the wireless network 102 (as shown in FIG. 1A). In some instances, the monitor module 210 can be configured to collect or receive observation data from one or multiple wireless communication devices (e.g., cellular phones) that communicate with a virtual BBU. In such instances, the observation data can be measured, received and/or collected based on, for example, the signals that are received from the virtual BBU at the wireless communication devices, or the signals that are sent from the wireless communication devices to the virtual BBU. In some other instances, the monitor module 210 can also be configured to collect or receive observation data from the virtual BBUs. Additionally, in some instances, data can be collected or received from the BBUs and/or wireless communication devices in the wireless network periodically in observation windows. Such an observation window can be, for example, one hour.

In some instances, data collected or received at the monitor module 210 can include a set of indicators that can be used to determine the performance of the wireless network. The set of indicators can include, for example, an admission indicator, a congestion indicator, a performance indicator, a mobile level measurement, a network configuration parameter, an indication of a network alarm, an available processing power associated with the virtual BBUs, a load associated with each virtual BBU in operation, and/or the like. In some embodiments, the indicators can include site-related configuration parameters, network-related configuration parameters, sector-related configuration parameters, RF-carrier-related configuration parameters, power indicators, throughput indicators, and/or various KPIs.

The site-related configuration parameters (configuration parameters per site) can include, for example, name of the site, longitude, latitude and altitude of the site, etc. The sector-related configuration parameters (configuration parameters per sector) can include, for example, site name, sector name, active/inactive status, frequency band, number of carriers for the sector, service for each carrier, height above the site ground level, antenna gain (e.g., in dBi), mechanical downtilt, electrical downtilt, total sector power (e.g., in dBm), etc. The RF-carrier-related configuration parameters (configuration parameters per RF carrier) can include, for example, site name, sector name, carrier number, carrier RF frequency, PN (pilot number) offset, active set threshold (e.g., in dB), maximum available power for the carrier (e.g., in dBm), pilot power (e.g., in dBm), synchro power (e.g., in dBm), paging power (e.g., in dBm), etc.

The KPIs can include, for example, carrier, site, sector, cell, and/or mobile level KPIs. The cell level KPIs can include, for example, a transmitted radio power level value of a cell, a successful call rate ("SCR") value of a cell, traffic statistical values associated with a cell, handover statistical values associated with a cell, a drop call rate ("DCR") value associated with a cell, an admission indicator, a congestion indicator, and/or the like. Specifically, the carrier level KPIs can include, for example, year/month/day/time, site name, sector name, carrier number, total average transmitted power (e.g., in dBm), uplink total noise (e.g., in dBm), downlink/uplink load factor (e.g., in percentage), uplink interference noise rise (e.g., in dB), number of downlink/uplink radio links used, connection success rate (e.g., in percentage), average number of attempted users, average number of connected users, average number of used codes, ratio of handoff (e.g., in percentage), connection success, downlink/uplink throughput (e.g., in kbps), etc.

The detector module 220 can detect degraded operational conditions for a set of BBUs in the wireless network. Specifically, the detector module 220 can receive the observation data (e.g., indicators) collected or received at the monitor module 210. Based on the collected or received observation data, the detector module 220 can detect the BBUs that demonstrate degraded performance in certain performance criteria. In some instances, the detector module 220 can determine if the received observation data meet certain performance criteria, cross a defined performance threshold, and/or the like.

In some embodiments, one or more performance metrics can be used to characterize the current mapping performance of the BBU-RRH pairs in the wireless network. Such performance metrics can include, for example, SCR (e.g., averaged over an observation window within a critical zone or a cell), dropped call rate (DCR), capacity (e.g., throughput of, for example, a critical zone or a cell), capacity increase ratio (e.g., change in the throughput of, for example, a critical zone or a cell relative to the initial traffic associated with that critical zone or cell), the power supplied to a base station, and/or the like.

In some embodiments, the detector module 220 can monitor the performance of the wireless network in terms of the frequency of negative or degraded performance incidents. For example, the detector module 220 can be configured to, based on the received data from the monitor module 210, detect BBU-RRH pairs that have repeated incidents of degraded performance (e.g., low SCR). In some embodiments, the detector module 220 can also receive indicators of the available processing power of the virtual BBUs. In such embodiments, the detector module 220 can also detect and/or identify virtual BBUs and/or processing resources (e.g., servers executing the virtual BBUs) that are under-utilized and/or over-utilized.

The optimization module 230 can determine how to reconfigure the topology and configuration of the wireless network provider system. Specifically, the optimization module 230 can determine when to instantiate new virtual BBU(s), terminate existing virtual BBU(s), establish and/or adjust the mapping of the virtual BBUs and the RRHs (e.g., between one-to-one (e.g., one RRH is assigned to a virtual BBU) and/or one-to-many (e.g., more than one RRHs are assigned to a virtual BBU)). Specifically, the optimization module 230 can receive the degraded RRH data (e.g., data from the RRHs that demonstrate degraded performance in certain performance criteria) collected at the detector module 220. Based on the received degraded RRH data, the optimization module 230 can determine how to map the network to establish an improved relationship between the virtual BBU(s) and the RRH(s).

The virtual resource configuration module 240 can be configured to execute instructions to instantiate new virtual BBU(s), terminate existing virtual BBU(s), establish and/or adjust the mapping of the virtual BBUs and the RRHs (e.g., between one-to-one (e.g., one RRH is assigned to a virtual BBU) and one-to-many (e.g., more than one RRHs are assigned to a virtual BBU)), based on the optimization data received from the optimization module 230.

For example, the monitor module 210 can collect data (e.g., KPIs) from the RRHs (e.g., 151-155 in FIG. 1A) and/or the BBUs (e.g., 111-113 in FIG. 1A) to monitor the performance of the wireless network. When a densification of the wireless network in an area increases (e.g., a game day in a stadium), the detector module 220 can detect a specific BBU-RRH association(s) that demonstrates low performance in certain performance criteria based on the observation data collected at the monitor module 210. The optimization module 230 can receive the degraded data and can determine that the low performing BBU is associated with four RRHs. Similarly stated, the low performing BBU is in a 1-4 BBU-RRH association. The optimization module 230 can instruct the virtual resource configuration module 240 to instantiate a new virtual BBU and establish a 1-1 BBU-RRH association to improve the performance of the lower performing BBU-RRH association. The virtual resource configuration module 240 receives and executes the instructions from the optimization module 230 to instantiate a new virtual BBU to service one or more RRH from the lower performing BBU. The communications interface 290 sends the virtualization instruction to the BBU pool server (e.g., 105 in FIG. 1A) to instantiate the new virtual BBU and establish a 1-1 BBU-RRH association to improve the performance of the wireless network. The monitor module 210 can continue to monitor the performance of the wireless network and repeat the process as needed or desired.

Figure 3A:
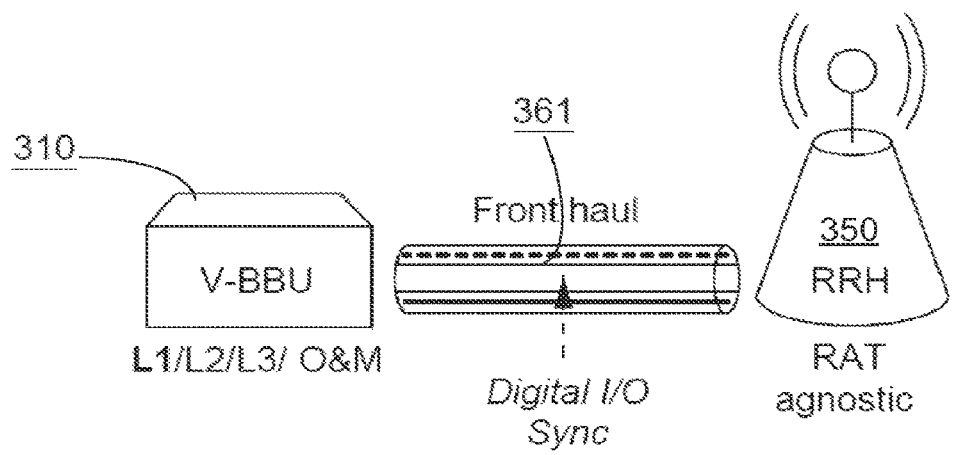
FIGS. 3A-3B are block diagrams that illustrate two front haul deployment options, according to an embodiment.
Figure 3B:
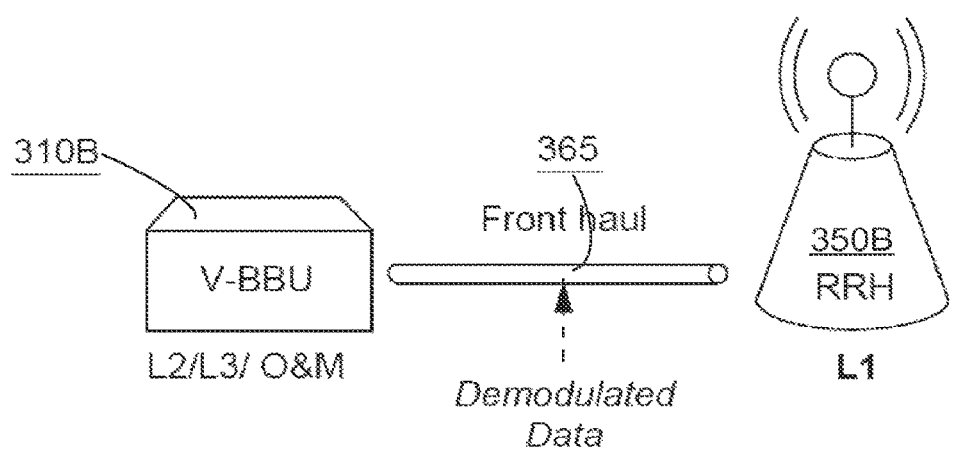

FIGS. 3A-3B are block diagrams that illustrate two front haul deployment options, according to two embodiments. The front haul (e.g., 165 as shown in FIG. 1B) can include a transport network that carries signaling and traffic data between RRHs and the virtual BBUs. The front haul standards can include, for example, common public radio interface (CPRI) and open base station architecture initiative (OBSAI). The physical medium of the front haul can be fiber, microwave, and/or any other high bandwidth technology.

FIG. 3A shows a full centralization front haul, according to an embodiment. In some embodiments, the virtual BBU 310 can support Layer 1, Layer 2 and Layer 3 traffic and signaling as well as operations and maintenance (O&M) functionality. The RRHs 350 can be radio access technology (RAT) agnostic allowing operators to dynamically switch the radio access technology when needed (e.g., LTE, UMTS, GSM, etc.). In other words, if Layer 1 is centralized, the communication informs the RRH what Layer 1 technology to use. This increases flexibility since multiple technologies at an RRH (assuming capabilities) can be used, but also increases bandwidth use. The full centralization front haul 361 can have multi-RAT support, resource sharing, and sufficient architecture for coordinated multi-point (CoMP) transmission and reception. As such, the full centralization front haul 361 can use high bandwidth for transporting the digitized L1 signals between a virtual BBU and the RRH.

FIG. 3B shows a partial centralization front haul, according to an embodiment. In some embodiments, the virtual BBUs 310B can be configured to support Layer 2, Layer 3 and O&M support, with Layer 1 residing at the RRH 350B level. The partial centralization front haul 365 may lack the flexibility as the full centralization front haul 361, but uses less bandwidth. In other words, if Layer 1 communication is not centralized or is partially centralized, the BBUs can provide less information to the RRHs, thus reducing the bandwidth. In one example, 2 percent to 5 percent of the bandwidth used by the full centralization front haul 361, as shown in FIG. 3A, may be used by the partial centralization front haul 365, as shown in FIG. 3B. As the full centralization front haul 361 supports Layer 1 traffic and signaling, it allows RRHs 350 to be technology agnostic and not limited to a specific technology (e.g., LTE, GSM, etc.). The partial centralization front haul 365, however, does not support Layer 1 traffic and signaling, and therefore the RRHs convert the information received from the BBUs into the right Layer 1 signal specific to a technology. Thus, the partial centralization front haul 365 is more dedicated to specific technology (e.g., LTE, GSM, etc.).

Figure 4:
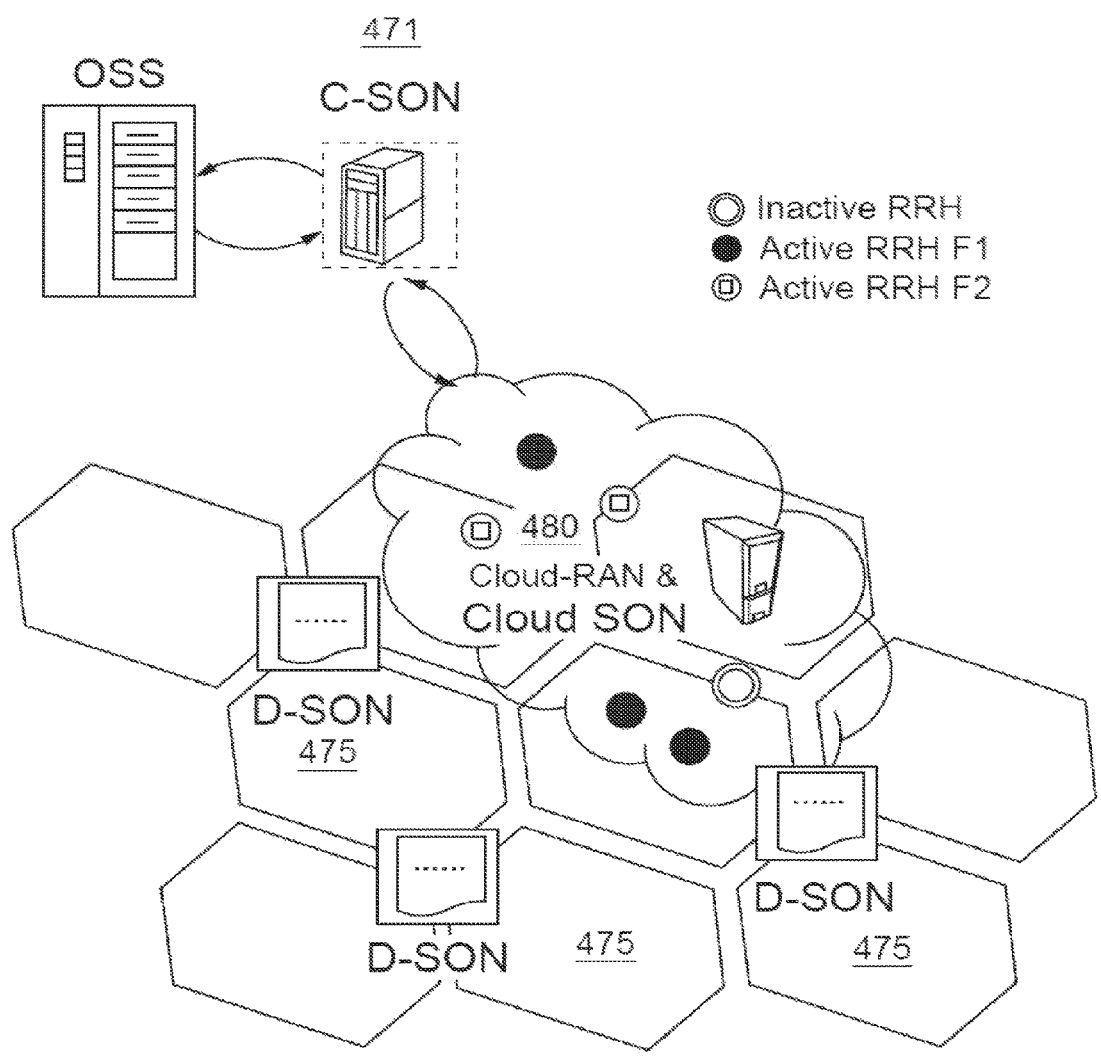
FIG. 4 is a schematic diagram that illustrates a cloud-based wireless network, according to an embodiment.

FIG. 4 is a schematic diagram that illustrates a wireless network, according to an embodiment. As shown in FIG. 4, wireless networks may have a combination of physical stand-alone network elements 475 (e.g., legacy deployed macro cells) and cloud-based radio access network islands 480. Distributed self-optimizing network elements ("D-SON") 475 can be configured to run at stand-alone; virtual network elements, whether hybrid and/or centralized self-optimizing, can be configured to run at the network level. As such, each cloud-based radio access network island 480 can have its own self-optimizing network functions and/or capabilities connected to the centralized SON module 471 serving the macro-cells. Similarly stated, the centralized/hybrid SON module 471 can communicate, control and/or coordinate with the SON functions associated with the cloud-based radio access network island 480 (e.g., can instantiate, rebalance and/or terminate BBUs) and with the D-SON 475 functions running at the network elements. In some embodiments, the centralized SON module 471 can also include the virtual BBUs used to control the cloud-based radio access network islands 480. In other embodiments, the virtual BBUs are not included at the centralized SON module 471, but on a separate device operatively coupled to the centralized SON module 471. In some embodiments, the D-SON 475 can operate independent of the centralized SON module 471. In other embodiments, the distributed SON systems 475 can coordinate with the centralized SON module 471 to improve operation of the entire network. In such embodiments, a single centralized SON module 471 can control and/or provide signals to the legacy D-SON network (e.g., having BBUs collocated with the RRHs) as well as the cloud-based SON portion of the network (e.g., the cloud-based radio access network island 480). This allows networks to implement such cloud-based SONs in a portion of a network without replacing the entire network at a given time.

Figure 5:
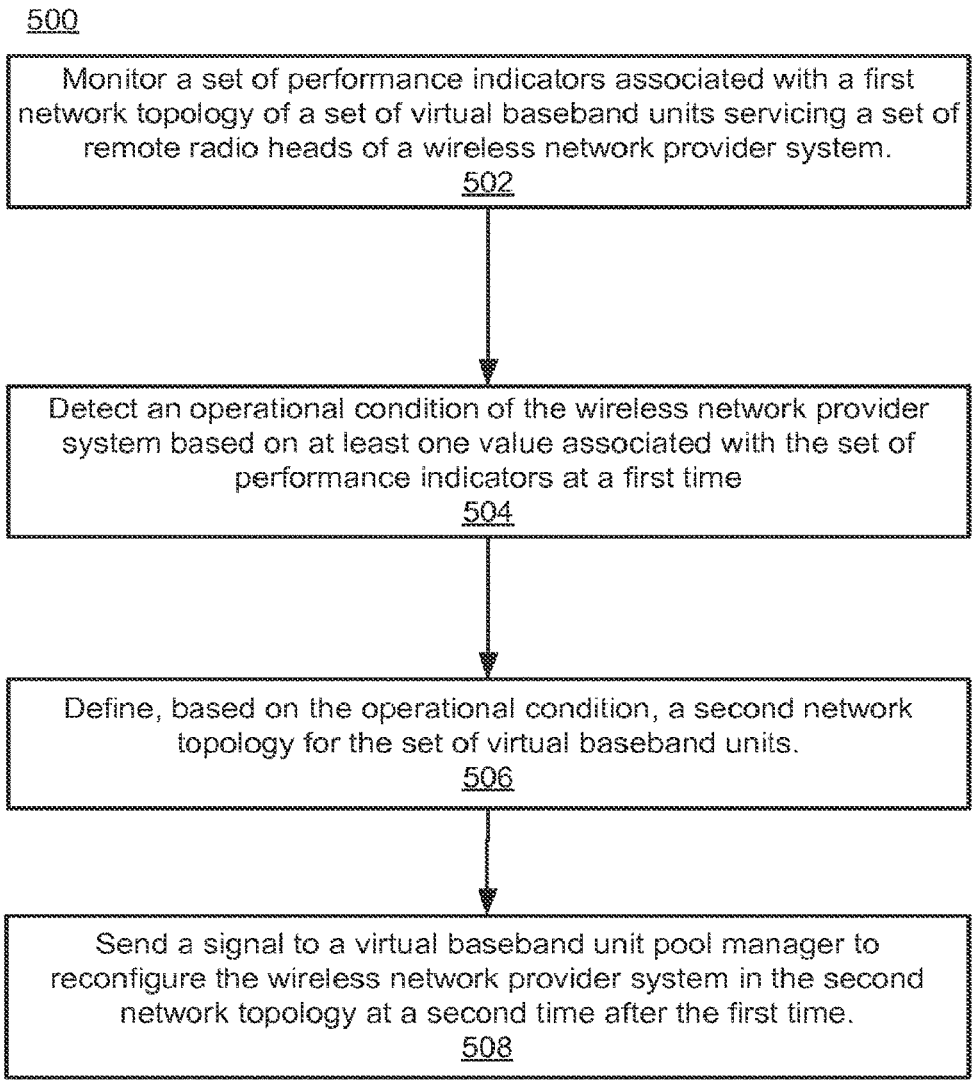
FIG. 5 is a flow chart illustrating an optimization method, according to an embodiment.

FIG. 5 is a flow chart illustrating a method 500 for dynamic virtualization and optimization in a wireless network, according to an embodiment. The optimization method 500 can be executed at, for example, a cloud network optimization module such as the cloud network optimization module 201 shown and described with respect to FIG. 2. The cloud network optimization module can include, for example, a monitor module, a detector module, an optimization module, and a virtual resource configuration module, which are similar to the modules of the cloud network optimization module 201 shown and described with respect to FIG. 2. Furthermore, the cloud network optimization module can be operatively coupled to a wireless network that is similar to the wireless network 102 shown and described with respect to FIG. 1A.

At 502, the cloud network optimization module monitors a set of performance indicators associated with a first network topology of a set of virtual baseband units (BBUs) servicing a set of remote radio heads (RRHs) of a wireless network provider system. The set of performance indicators can include, for example, an admission indicator, a congestion indicator, a power indicator, a mobile level measurement, a network configuration parameter, an indication of a network alarm, link connection information, a throughput indication, a key performance indicator (KPI), an available processing power associated with the virtual BBUs, a load associated with each virtual BBU in operation, and/or the like.

At 504, the cloud network optimization module detects an operational condition of the wireless network provider system based on at least one value associated with the set of performance indicators at a first time. For example, the operational condition can be a condition when one value associated with the set of performance indicators fails to meet a performance criteria.

At 506, the cloud network optimization module defines, based on the operational condition, a second network topology for the set of virtual baseband units. In the second network topology, there can be more virtual baseband units than the virtual baseband units in the first network topology servicing the same set of remote radio heads. In another implementation, there can be less virtual baseband units than the virtual baseband units in the first network topology servicing the same set of remote radio heads, thus reducing power used by the virtual baseband units. The associations between each virtual baseband unit and each remote radio heads can be different in the second network topology from the first network topology. For example, the associations of the virtual BBUs and the RRHs can be one-to-one (e.g., one RRH is assigned to a virtual BBU) or one-to-many (e.g., more than one RRHs are assigned to a virtual BBU).

At 508, the cloud network optimization module sends a signal to a virtual baseband unit pool manager to reconfigure the wireless network provider system in the second network topology at a second time after the first time. For example, the virtual baseband unit pool manager can instantiate a virtual baseband unit such that the virtual baseband unit is added to the set of virtual baseband units, terminates a virtual baseband unit from the set of virtual baseband units, or adjusts an association or mapping of the set of virtual baseband units to the set of remote radio heads.

It is intended that the systems and methods described herein can be performed by software (stored in memory and/or executed on hardware), hardware, or a combination thereof. Hardware modules may include, for example, a general-purpose processor, a field programmable gate array (FPGA), and/or an application specific integrated circuit (ASIC). Software modules (executed on hardware) can be expressed in a variety of software languages (e.g., computer code), including Unix utilities, C, C++, Java™, Ruby, SQL, SAS®, the R programming language/software environment, Visual Basic™, and other object-oriented, procedural, or other programming language and development tools. Examples of computer code include, but are not limited to, micro-code or micro-instructions, machine instructions, such as produced by a compiler, code used to produce a web service, and files containing higher-level instructions that are executed by a computer using an interpreter. Additional examples of computer code include, but are not limited to, control signals, encrypted code, and compressed code. Each of the devices described herein, for example, devices S1, S2, and S3, nodes, servers and/or switches, etc. can include one or more processors as described above.

Some embodiments described herein relate to devices with a non-transitory computer-readable medium (also can be referred to as a non-transitory processor-readable medium or memory) having instructions or computer code thereon for performing various computer-implemented operations. The computer-readable medium (or processor-readable medium) is non-transitory in the sense that it does not include transitory propagating signals per se (e.g., a propagating electromagnetic wave carrying information on a transmission medium such as space or a cable). The media and computer code (also can be referred to as code) may be those designed and constructed for the specific purpose or purposes. Examples of non-transitory computer-readable media include, but are not limited to: magnetic storage media such as hard disks, floppy disks, and magnetic tape; optical storage media such as Compact Disc/Digital Video Discs (CD/DVDs), Compact Disc-Read Only Memories (CD-ROMs), and holographic devices; magneto-optical storage media such as optical disks; carrier wave signal processing modules; and hardware devices that are specially configured to store and execute program code, such as Application-Specific Integrated Circuits (ASICs), Programmable Logic Devices (PLDs), Read-Only Memory (ROM) and Random-Access Memory (RAM) devices. Other embodiments described herein relate to a computer program product, which can include, for example, the instructions and/or computer code discussed herein.

While various embodiments have been described above, it should be understood that they have been presented by way of example only, and not limitation. Where methods and steps described above indicate certain events occurring in certain order, the ordering of certain steps may be modified. Additionally, certain of the steps may be performed concurrently in a parallel process when possible, as well as performed sequentially as described above. Although various embodiments have been described as having particular features and/or combinations of components, other embodiments are possible having any combination or sub-combination of any features and/or components from any of the embodiments described herein. Furthermore, although various embodiments are described as having a particular entity associated with a particular compute device, in other embodiments different entities can be associated with other and/or different compute devices.

What is claimed is:

1. A non-transitory computer-readable medium storing instructions, the instructions comprising:
one or more instructions that, when executed by one or more processors of a user device, cause the one or more processors to:
monitor a plurality of performance indicators associated with a first network topology of a set of virtual baseband units servicing a plurality of remote radio heads of a wireless network provider system, the first network topology including a first mapping of a first virtual baseband unit to a first quantity of first remote radio heads, of the plurality of remote radio heads, and a second mapping of a second virtual baseband unit to a second quantity of second remote radio heads, of the plurality of remote radio heads,
the first remote radio heads and the second remote radio heads being mutually exclusive;
detect an operational condition of the wireless network provider system based on at least one value associated with the plurality of performance indicators at a first time;
define, based on the operational condition, a second network topology for the set of virtual baseband units,
the second network topology including a third mapping of the first virtual baseband unit to a third quantity of remote radio heads, of the plurality of remote radio heads, that is different than the first quantity of first remote radio heads; and
send a signal to a virtual baseband unit pool manager to reconfigure the wireless network provider system in the second network topology at a second time after the first time.

2. The non-transitory computer-readable medium of claim 1, wherein the one or more instructions further cause the one or more processors to at least one of:
instantiate a virtual baseband unit such that the virtual baseband unit is added to the set of virtual baseband units, or
terminate a virtual baseband unit from the set of virtual baseband units.

3. The non-transitory computer-readable medium of claim 1, wherein each remote radio head from the plurality of remote radio heads is associated with a particular virtual baseband unit from the set of virtual baseband units in the second network topology.

4. The non-transitory computer-readable medium of claim 1, wherein multiple remote radio heads from the plurality of remote radio heads are assigned to a single virtual baseband unit from the set of virtual baseband units in the second network topology.

5. The non-transitory computer-readable medium of claim 1, wherein the plurality of performance indicators include at least one of an admission indicator, a congestion indicator, a power indicator, a mobile level measurement, a network configuration parameter, an indication of a network alarm, link connection information, a throughput indication, or a key performance indicator (KPI).

6. The non-transitory computer-readable medium of claim 1, wherein the plurality of performance indicators include at least one of an admission indicator, a congestion indicator, a successful call rate (SCR), a dropped call rate (DCR), a capacity of a cell, or a capacity increase ratio of the cell,
the plurality of performance indicators being averaged over an observation window.

7. The non-transitory computer-readable medium of claim 1, wherein each remote radio head from the plurality of remote radio heads is agnostic to a radio access technology (RAT).

8. The non-transitory computer-readable medium of claim 1, wherein each remote radio head from the plurality of remote radio heads is specific to a radio access technology (RAT).

9. A device, comprising:
a memory; and
a processor, operatively coupled to the memory, to:
- monitor a plurality of performance indicators associated with a wireless network provider system,
  - the wireless network provider system including a first set of virtual baseband units servicing at a first time a set of remote radio heads from a plurality of remote radio heads to define a first network topology, and
  - the first network topology including a first mapping of a first virtual baseband unit to a first quantity of first remote radio heads, of the plurality of remote radio heads, and a second mapping of a second virtual baseband unit to a second quantity of second remote radio heads, of the plurality of remote radio heads,
    - the first remote radio heads and the second remote radio heads being mutually exclusive;
- define an operational condition of the wireless network provider system, at the first time, when at least one value associated with the plurality of performance indicators fails to meet a performance criterion; and
- send a signal to a virtual baseband unit pool manager, at a second time after the first time, such that the virtual baseband unit pool manager causes a second set of virtual baseband units to service the set of remote radio heads from the plurality of remote radio heads after the second time to define a second network topology different from the first network topology,
  - the second network topology including a third mapping of the first virtual baseband unit to a third quantity of remote radio heads, of the plurality of remote radio heads, that is different than the first quantity of first remote radio heads.

10. The device of claim 9, wherein the first set of virtual baseband units includes a greater number of virtual baseband units than the second set of virtual baseband units.

11. The device of claim 9, wherein the first set of virtual baseband units includes a fewer number of virtual baseband units than the second set of virtual baseband units.

12. The device of claim 9, wherein the processor is further to:
send another signal to the virtual baseband unit pool manager, at a third time after the first time, such that the first set of virtual baseband units and the second set of virtual baseband units collectively service the set of remote radio heads after the third time,
the second set of virtual baseband units being mutually exclusive from the first set of virtual baseband units.

13. The device of claim 9, wherein the processor is further to:
send another signal to the virtual baseband unit pool manager, at a third time after the first time, to terminate the first set of virtual baseband units such that the first set of virtual baseband units stops servicing the set of remote radio heads.

14. The device of claim 9, wherein the plurality of performance indicators include at least one of an admission indicator, a congestion indicator, a transmitted radio power level of a cell, a successful call rate value of a cell, a traffic statistical value of a cell, a drop call rate value of a cell, an averaged transmitter radio power level, an uplink total noise value, or a downlink/uplink load factor.

15. A method, comprising:
monitoring a plurality of performance indicators associated with a first network topology and configuration of a wireless network provider system,
- the first network topology and configuration including a first set of virtual baseband units servicing a first plurality of remote radio heads of the wireless network provider system, and
- the first network topology and configuration including a first mapping of a first virtual baseband unit to a first quantity of first remote radio heads and a second mapping of a second virtual baseband unit to a second quantity of second remote radio heads,
  - the first remote radio heads and the second remote radio heads being mutually exclusive;
defining, at a first time and based on at least one value associated with the plurality of performance indicators, a second network topology and configuration of the wireless network provider system,
- the second network topology and configuration including a second set of virtual baseband units servicing a second plurality of remote radio heads of the wireless network provider system,
- the second network topology and configuration including a third mapping of the first virtual baseband unit to a third quantity of remote radio heads that is different than the first quantity of first remote radio heads; and
sending a signal to a virtual baseband unit pool manager to transition the wireless network provider system from the first network topology and configuration to the second network topology and configuration at a second time after the first time.

16. The method of claim 15, wherein:
the first plurality of remote radio heads is a same plurality of remote radio heads as the second plurality of remote radio heads,
the second set of virtual baseband units includes the first set of virtual baseband units and a third set of virtual baseband units, and
the sending includes sending the signal to instruct the virtual baseband unit pool manager to instantiate the third set of virtual baseband units.

17. The method of claim 15, wherein:
the first plurality of remote radio heads is a same plurality of remote radio heads as the second plurality of remote radio heads,
the first set of virtual baseband units includes the second set of virtual baseband units and a third set of virtual baseband units, and
the sending includes sending the signal to instruct the virtual baseband unit pool manager to terminate the third set of virtual baseband units.

18. The method of claim 15, wherein:
the first virtual baseband unit services a first remote radio head but not a second remote radio head in the first network topology and configuration, and
the first virtual baseband unit services the first remote radio head and the second remote radio head in the second network topology and configuration.

19. The method of claim 15, wherein:
the first virtual baseband unit services a first remote radio head and a second remote radio head in the first network topology and configuration, and
the first virtual baseband unit services the first remote radio head but not the second remote radio head in the second network topology and configuration.

20. The method of claim 15, wherein the first plurality of remote radio heads is agnostic to a radio access technology (RAT).

21. The method of claim 15, wherein:
the first virtual baseband unit services multiple remote radio heads in the first network topology and configuration, and
the first virtual baseband unit services only one remote radio head in the second network topology and configuration.

* * * * *